United States Patent [19]
Venditty

[11] 3,752,085
[45] Aug. 14, 1973

[54] VEHICLE TRANSPORTER
[75] Inventor: Anthony Venditty, Fraser, Mich.
[73] Assignee: General Motors Corporation, Detroit, Mich.
[22] Filed: July 8, 1971
[21] Appl. No.: 160,946

Related U.S. Application Data
[63] Continuation of Ser. No. 879,659, Nov. 25, 1969, abandoned.

[52] U.S. Cl........ 105/368 R, 105/366 B, 105/368 T
[51] Int. Cl........................... B60p 7/08, B61d 45/00
[58] Field of Search .................... 105/366 B, 368 R, 105/368 T, 369 A; 214/38.6, 38.8; 280/179; 248/361 R, 361 A

[56] References Cited
UNITED STATES PATENTS

| | | | |
|---|---|---|---|
| 1,845,594 | 2/1932 | Fildes............................ | 105/366 C |
| 2,118,364 | 5/1938 | Sheehan.......................... | 105/368 B |
| 2,129,950 | 9/1938 | Loney................................. | 105/368 |
| 2,159,479 | 5/1939 | Goodwin et al................. | 105/368 B |
| 2,402,283 | 6/1946 | Hewitt............................ | 105/368 R |
| 2,424,429 | 7/1947 | Bamberg......................... | 105/366 C |
| 2,432,228 | 12/1947 | Delano........................... | 105/368 R |
| 2,996,020 | 8/1961 | Udstad............................... | 105/368 |
| 3,168,876 | 2/1965 | Clejan............................ | 105/366 C |
| 3,182,610 | 5/1965 | Jones................................. | 105/368 |
| 3,399,921 | 9/1968 | Trost et al...................... | 105/366 C |
| 2,503,368 | 4/1950 | Willetts........................... | 248/361 R |
| 2,060,027 | 11/1936 | Butterworth.................... | 105/368 R |
| 3,605,636 | 9/1971 | Blunden et al................. | 105/368 T |
| 3,613,914 | 10/1971 | Jaekle et al..................... | 105/368 R |

OTHER PUBLICATIONS
Southern Pacific Bulletin, July 1969.

Primary Examiner—Drayton E. Hoffman
Attorney—J. L. Carpenter and E. J. Biskup

[57] ABSTRACT

A wheeled transporter supporting a plurality of vehicles in a vertical position during transit. The transporter has a base frame connected with a roof portion so as to form an enclosure having at least one opening provided in one side of the transporter. A door has one end thereof hingedly connected to the frame in the opening for movement about a horizontal axis parallel to the longitudinal axis of the transporter. The door includes a pair of tracks formed on one side thereof for guiding the wheels of a vehicle onto the door when the latter is in the lowered position. Cooperating means are attached to the underside of the vehicle and to each door between the tracks for automatically locking the vehicle on the door when the vehicle is driven on the door with its wheels in the tracks.

2 Claims, 8 Drawing Figures

INVENTOR.
Anthony Venditty
BY
E. J. Biskup
ATTORNEY

INVENTOR.
Anthony Venditty

BY
C. J. Biskup
ATTORNEY

VEHICLE TRANSPORTER

This application is a continuation of Ser. No. 879,659, filed Nov. 25, 1969, now abandoned.

This invention concerns a vehicle transporter and more particularly a railway type transporter which is adapted to carry vehicles in a vertical position.

Vehicles are presently shipped on railway cars in a horizontal position and are usually held in position by a plurality of chains. There are a number of objections to this method of securing vehicles on railway cars, not the least of which is that it requires a large number of personnel which must work together in order to manipulate, position, and secure the chains between the vehicle and the railway car floor. Apart from this problem, it has been found that railway car movement during transportation has frequently caused the chains to become slack as the vehicle suspension springs are compressed and relaxed. As a result, the vehicle is subjected to excessive lateral and longitudinal movement which could damage parts of the vehicle. Another problem with the present form of railway cars used for transporting vehicles is that the vehicles are not fully enclosed and consequently are not protected against vandalism and pilferage.

The present invention is intended to alleviate the problems mentioned above by providing a closed wheeled transporter in the form of a railway car which has the individual sides thereof provided with hinged doors which are movable about a horizontal axis extending longitudinally of the vehicle. Each door serves as a ramp when in the lowered position to permit the vehicle to be driven thereon in a correct loading position. A pair of guide tracks are formed on the inner side of the door to serve as the wheel path for the vehicle and proper wheel guidance is maintained on the vehicle wheels by raised sides of the ramp so as to eliminate any driver error. Hooks are provided on the door between the guide tracks and keepers are located on the underside of the vehicle for engaging the hooks. When the vehicle is driven onto the door along the guide tracks, suitable wells formed along each guide track accommodate the wheels of the vehicle and position the keepers slightly behind the hooks. The door is normally inclined so that upon raising the door, the vehicle rolls slightly forward and causes the keepers to engage the hooks. The weight of the vehicle provides a downward force which helps retain the vehicle in a tie-down position on the railway car door.

The objects of the invention are to provide a wheeled transporter having a hinged side door which can be lowered to an inclined position and includes guide tracks permitting a vehicle to be driven thereon and automatically locked thereto when the door is moved to a raised position; to provide a door which can be hingedly mounted on a vehicle and adapted to support a vehicle thereon by means of an automatic latching arrangement, a part of which is carried by the underside of the vehicle while the other part is mounted on the inner surface of the door; to provide a transporter for carrying vehicles in a vertical position and having a hinged side door which can be lowered for receiving vehicles and includes cooperating locking means which automatically lock the vehicle to the door when the vehicle is driven onto the door; to provide a railway car transporter which will support vehicles in a vertical position during transit and includes side doors which are hingedly mounted to the railway car and movable to a lowered position for receiving vehicles; to provide a hinged door for a transporter which serves as a ramp for accommodating vehicles and includes parallel guide tracks for the wheels of the vehicle, the guide tracks having wells formed therein for stopping the vehicle in a position preparatory to automatic locking onto the door which occurs in response to raising movement of the door; and to provide a door for a transporter that has an inclined loading position and is formed with guide tracks which serve to locate a vehicle onto the door in a position which assures that upon raising the door to a vertical position cooperating locking means formed on the underside of the vehicle and on the door will engage and restrain the vehicle from movement during transportation.

Other objects and advantages of the above-described invention will be apparent from the following detailed description when taken with the drawings in which.

Figure 1:
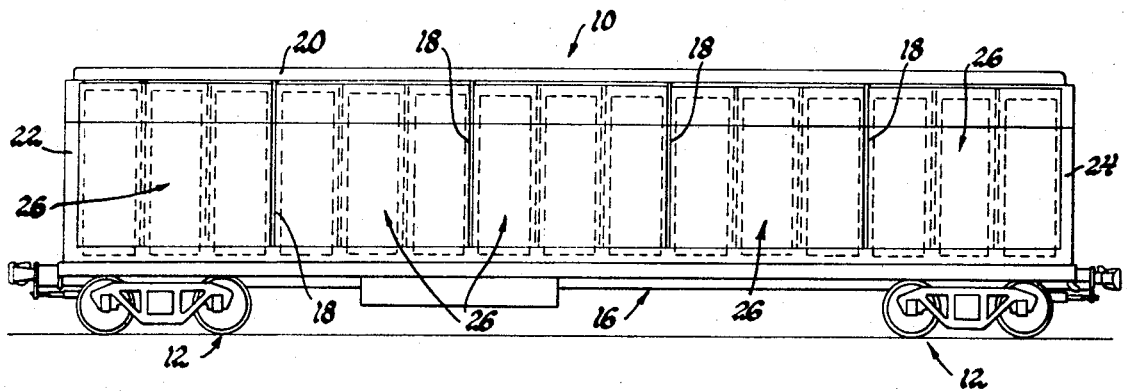
FIG. 1 is a side elevational view showing a railway car having hinged side doors made in accordance with the invention.
Figure 2:
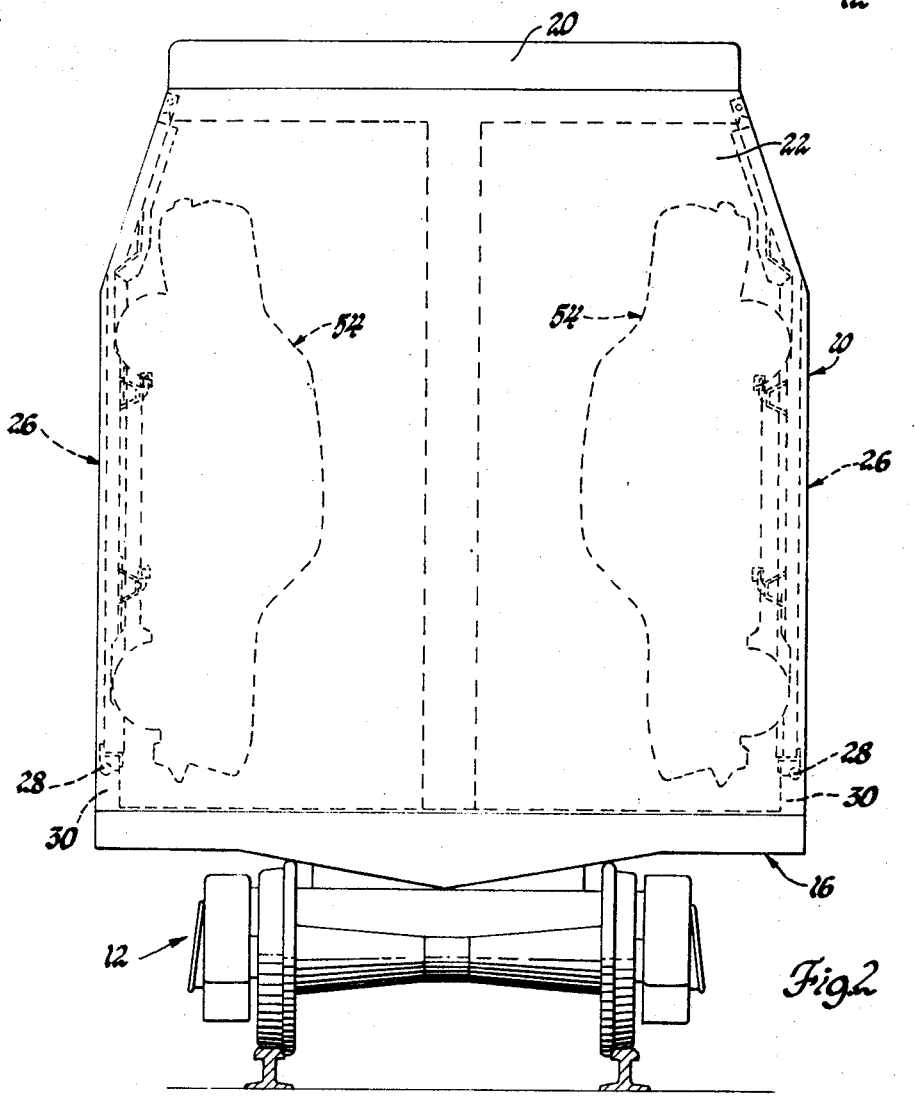
FIG. 2 is an enlarged end view of the railway car shown in FIG. 1 and shows the position of the vehicles during transit.

Referring to the drawings and particularly FIGS. 1 and 2 thereof, a railway car 10 is shown supported by trucks 12 located adjacent the opposite ends of the car. The railway car 10 comprises a base frame or floor portion 16, each side of which rigidly supports a plurality of axially spaced upright posts 18, the upper ends of which support a roof 20 which extends the entire length of the railway car. The opposite ends of the car are provided with rigid end walls 22 and 24 which connect the roof 20 and the base frame 16 so as to form an enclosure. As best seen in FIG. 2, along each side of the railway car 10 are a plurality of identical doors 26, each of which is hingedly connected by a horizontal pivotal connection 28 to an upright brace member 30 which is fixedly secured to the base frame 16. Each of the doors 26 is shown in the raised or closed position and by releasing suitable latch means (not shown) the door 26 is adapted to be lowered about its pivotal connection 28 to the position shown in FIG. 3.

Figure 6:
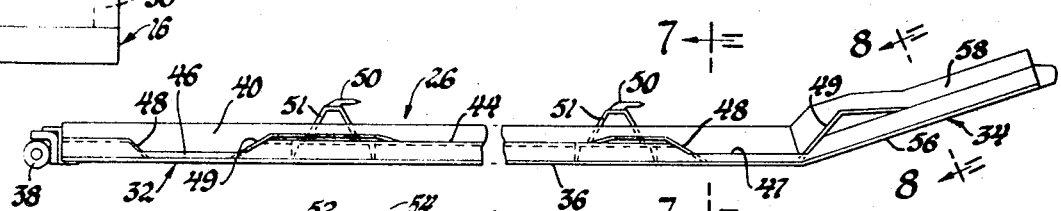
FIG. 6 is a side elevational view of the door showing in detail its construction.
Figure 7:
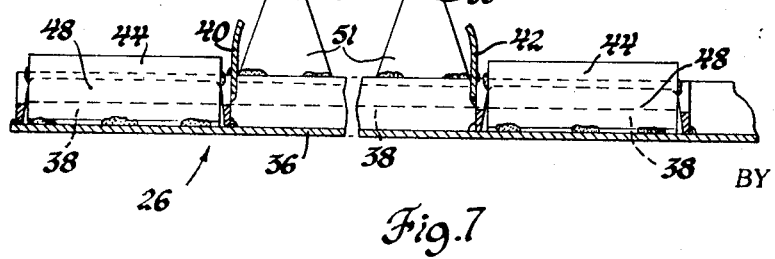
FIG. 7 is an enlarged cross-sectional view taken on line 7—7 of FIG. 6.

Each door 26 is adapted to support at least one vehicle in a vertical position during transit and, as seen in FIGS. 6 and 7, comprises a generally planar section 32 which is rigid with an end section 34 that extends at an acute angle relative to the section 32. In the preferred form, each door 26 can accommodate three vehicles; however, as should be apparent, the number of vehicles to be positioned on one door is a matter of choice and depends primarily on the strength of the door as well as the hinge connection and the lifting power of the device employed for raising the door to the closed position. Inasmuch as each vehicle mounting area on the inner side of the door 26 is identically formed, only one loading portion will be described.

The section 32 of each door 26 includes a flat base plate 36 which at one end rigidly supports a transversely extending bushing member 38 which is adapted to be pinned to the railway car so as to form the aforementioned pivotal connection 28. The base plate 36 serves as the outside wall of the door 26 when in the raised position and rigidly supports upright guide plates 40 and 42 which are laterally spaced a distance which is equal to the distance between the inner portions of the tires on the vehicle to be loaded on the door 26. A raised track 44 is located adjacent each guide plate 40 and 42 for accommodating the wheels of the vehicle and, as seen in FIG. 6, each track 44 has a pair of wells 46 and 47 for the wheels of the vehicle. Each well 46 and 47 is defined by front and rear inclined walls 48 and 49 which serve as wheel stop members as will be described hereinafter.

Figure 8:
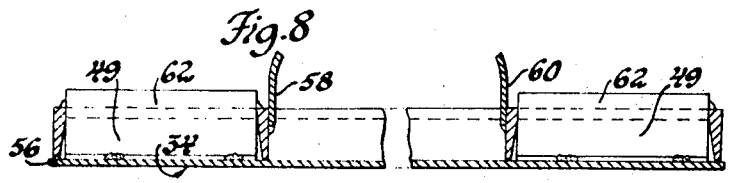
FIG. 8 is an enlarged cross-sectional view taken on line 8—8 of FIG. 6.

Located between the guide plates 40, 42 and the wells 46, 47 are four hook members 50, each of which is supported by a stanchion 51 fixed with the base plate 36 and is wedge-shaped and extends toward the end section 34 of the door 26. The hook members 50 are positioned in pairs between the tracks 44 and located at a height which permits them to mate with keeper members 52 secured to the underside of a vehicle 54 as seen in FIG. 7. It will be understood that, as seen in FIG. 8, the end section 34 also includes an outer base plate 56 formed with upright wheel guide plates 58 and 60 which are axially aligned with the guide plates 40 and 42 of the section 32 and are an extension thereof. Similarly, spaced tracks 62 are provided in the section 34 adjacent each guide plate and are an extension of the tracks 44 formed in the section.

Figure 3:
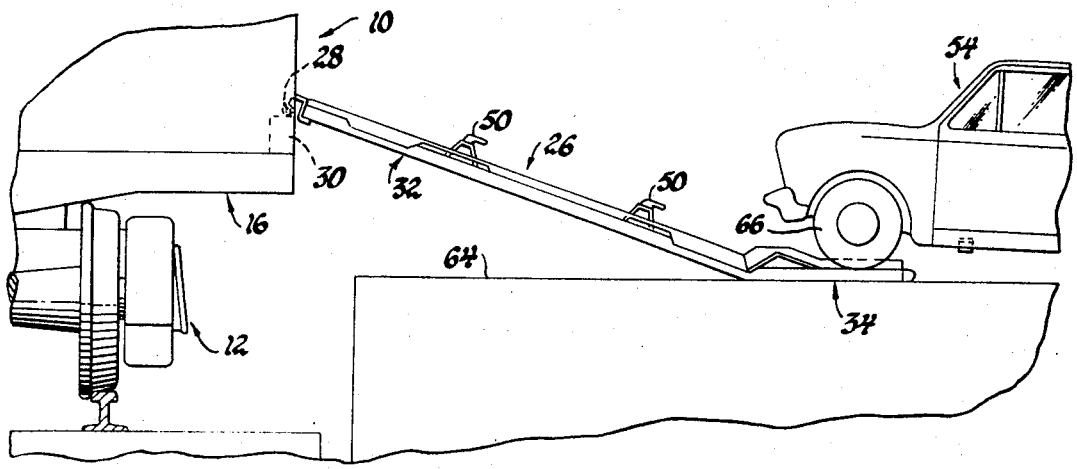
FIG. 3 is a view showing one of the side doors of the railway car of FIGS. 1 and 2 in the lowered position and a vehicle starting to be driven onto the door.
Figure 4:
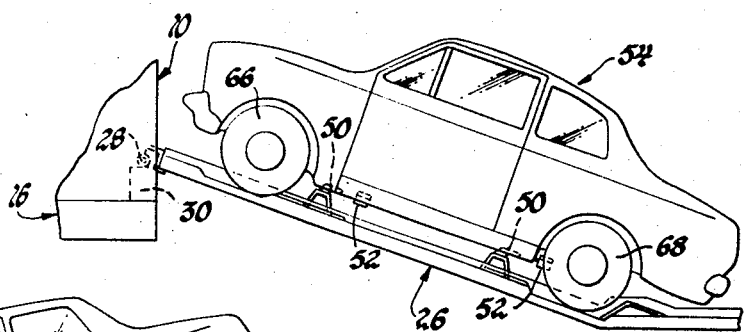
FIG. 4 is similar to FIG. 3 and shows the vehicle located on the door.
Figure 5:
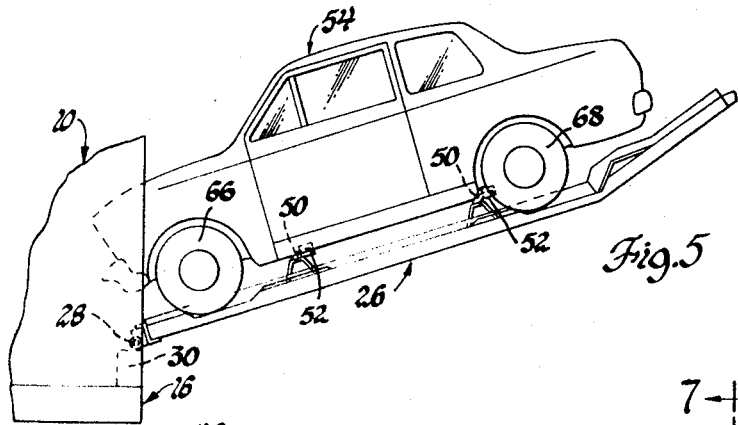
FIG. 5 is a view similar to FIG. 4 but shows the door being raised so as to cause automatic locking of the vehicle onto the door.

In loading vehicles on the door 26, the railway car 10 will normally be located adjacent a docking area which, as seen in FIG. 3, will have a drive-on or loading surface 64 of a predetermined height relative to the pivotal connection 28 supporting the door 26 on the railway car. As should be apparent, this height will determine the angularity at which the end section 34 is to be attached to the section 32 so that upon lowering the door 26 to the loading position the base plate 56 of end section 34 will be in surface-to-surface contact with the loading surface 64. In this position, the section 32 is located on an incline and serves as a ramp. The vehicle 54 is then driven onto the end section 34 with the front wheels 66 being guided along tracks 62 by the guide plates 58 and 60. As the vehicle 54 continues to be driven up the door 26, the front wheels 66 will first be driven down the rear wall 49 of well 47 in the track 44 and then up front wall 48 so as to permit the keeper members 52 at the front end of the vehicle to clear the rear hook members 50. The front wheels 66 will continue along the track 44 elevated at a height greater than the lowest point of each well 46, 47 and as the vehicle continues to be driven up the door 26, both the front and rear wheels 66 and 68 respectively will drop into the front and rear wells 46 and 47 at the same time so that the vehicle is located on the door 26 in the manner as seen in FIG. 4. In this position, the rear wall sections 49 of each well 46 and 47 act as stop members to prevent the vehicle from rolling rearwardly off of the door. Moreover, it will be noted that, as seen in FIG. 4, the front and rear keeper members 52 on the vehicle are positioned to the rear of the hook members 50. Thereafter, a suitable lifting device, such as a fork lift truck, can have the tines thereof placed under the end section 34 of the door 26 and proceed to raise the latter into its closed position of FIG. 2. During such movement the vehicle 54 will move forwardly and, as seen in FIG. 5, cause the front and rear keeper members 52 to engage the front and rear hook members 50 formed on the door 26 so as to automatically lock the vehicle to the door. The door 26 may thereafter be completely closed as seen in FIG. 2, and as aforementioned, latch means (not shown) maintain the door 26 in the closed position with the vehicle being supported vertically with the vehicle front end located adjacent the base frame 16, while the vehicle rear end is adjacent the roof 20 of the railway car 10.

The locking procedure of the vehicle 54 onto door 26 as described above should be used in those instances where the loading surface 64 is located significantly below the pivotal connection 28. It is possible, however, to load vehicles on the door 26 when the latter is located in a horizontal position. In such case, the end section would have to be located in the same plane with section 32 so that the entire outer surface of the door would be in surface-to-surface contact with the loading surface 64. This can be realized with a hinge arrangement between the sections 32 and 34. It will be noted, however, that when the door 26 is horizontally disposed for loading purposes, the mating of the keeper members 52 with the hook members 50 need not necessarily occur in response to the lifting movement of the door. The flat horizontal wheel contact surface of each well 46 and 47 is of a length which would permit the vehicle to be driven forwardly until the front walls 48 of each well is engaged by the wheels 66 and 68 at which time mating of the hook and keeper members would occur. Similarly, as seen in FIG. 4, if the vehicle 54 were driven upwardly along the door 26, the aforedescribed locking would occur when the wheels 66 and 68 contact the front walls of the wells 46 and 47. This position could be maintained by actuating the emergency brake system of the vehicle.

In order to obtain proper mating between the hook members 50 and the keeper members 52, the latter should be located on the frame of the vehicle and preferably between the front and rear wheels 66 and 68 as shown in FIGS. 4 and 5. Moreover, the keeper members 52 should be accurately located relative to each other and it has been found that if done so within ± 0.0312 inch and within ± 0.50 inch relative to the hook members 50, engagement between the two members is not difficult to obtain. In addition, an important advantage provided by the loading technique described above is that when the vehicle 54 assumes the position of FIG. 4, the weight of the vehicle causes compression of the springs of the vehicle suspension system. As a consequence, when the keeper members 52 mate with the hook members 50 during the raising movement of the door 26, the loading on the suspension springs is equivalent to the weight of the vehicle 54 so when the latter assumes the vertical position of FIG. 2, the suspension springs are preloaded thereby helping to prevent any excessive movement of the vehicle while it is being transported in the railway car in a vertical position.

Various changes and modifications can be made in this construction without departing from the spirit of the invention. For example, the door 26 need not have two sections which are angularly disposed relative to each other but can be made as a single planar section. Also, only the free end of the door must be in contact with the docking surface during a loading operation although surface-to-surface contact as hereinbefore described does serve to distribute the weight of the vehicles over a larger area. Such changes and modifications are contemplated by the inventor and he does not wish to be limited except by the scope of the appended claims.

I claim:

1. A wheeled transporter for supporting a plurality of vehicles in a vertical position during transit, comprising a base frame supporting a roof portion to form an enclosure having a plurality of openings on each side of the transporter, a door provided for each opening on each side of the transporter, and having one end thereof hingedly connected to said base frame for movement about a horizontal axis parallel to the longitudinal axis of the transporter, said door adapted to be moved about said horizontal axis between a raised position wherein the opening is closed and the door is substantially vertically orientated and a lowered position wherein the door is inclined downwardly from said one end so as to form a ramp for vehicle loading, a pair of parallel tracks formed on the inner side of said door, each of said tracks extending substantially perpendicular to said horizontal axis and having a pair of wells formed therein for the front and rear wheels of a vehicle, guide plates attached to the door adjacent the tracks for guiding the wheels of a vehicle driven onto said door along said tracks when the door is in the lowered position, each of said wells having a wall for preventing the vehicle from freely rolling in a direction away from said one end of the door after the vehicle has been driven onto said door and when the latter is in said lowered position, cooperating means attached to the underside of the vehicle and to each door for automatically locking the vehicle on said door when the wheels of the vehicle are located in said wells and when the door is moved from the lowered position to the raised position, said wall being so positioned relative to the engaging member on the door that the engaging member on the vehicle is spaced longitudinally from the engaging member on the door when the door is in the lowered position with the vehicle thereon but allows the vehicle to move towards said one end of the door to cause interlocking of said engaging members when the door is moved to the raised position.

2. A wheeled transporter for supporting a plurality of vehicles in a vertical position during transit, comprising a base frame supporting a roof portion to form an enclosure having at least one opening on each side of the transporter, a door provided for each opening on each side of the transporter and having one end thereof hingedly connected to said frame for movement about a horizontal axis parallel to the longitudinal axis of the transporter, said door adapted to be moved about said horizontal axis between a raised position wherein the opening is closed and the door is substantially vertically orientated and a lowered position wherein the door is inclined downwardly from said one end so as to form a ramp for vehicle loading, a pair of parallel tracks formed on the inner side of said door, each of said tracks extending substantially perpendicular to said horizontal axis and having a pair of wells formed therein for the front and rear wheels of the vehicle, vertical guide plates attached to the door adjacent the tracks for guiding the wheels of a vehicle driven onto said door along said track when the door is in the lowered position, each of said wells having a wall for preventing the vehicle from freely rolling in a direction away from said one end of the door after the vehicle has been driven onto said door and when the latter is in said lowered position, hook members fixed with said door between said tracks and spaced along the length thereof, keeper members attached to the underside of the vehicle for automatically mating with said hook members for locking the vehicle on said door when the wheels of the vehicle are located in said wells and when the door is moved from the lowered position to the raised position, said wall being so positioned relative to the hook members on the door that the keeper members on the vehicle are longitudinally spaced to the rear of said hook members when the door is in the lowered position with the vehicle thereon but allows the vehicle to move towards said one end of the door to cause interlocking of said hook and keeper members when the door is moved to the raised position.

* * * * *